US012735617B2

(12) United States Patent
Perez et al.

(10) Patent No.: US 12,735,617 B2
(45) Date of Patent: Sep. 15, 2026

(54) FLOWABLE HARDENABLE COMPOSITION, THERMALLY CONDUCTIVE COMPOSITION, AND ELECTRONIC HEAT SINK ASSEMBLY INCLUDING THE SAME

(71) Applicant: 3M INNOVATIVE PROPERTIES COMPANY, St. Paul, MN (US)

(72) Inventors: Mario A. Perez, Burnsville, MN (US); Jaime A. Martinez, Kissimmee, FL (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 794 days.

(21) Appl. No.: 18/008,813

(22) PCT Filed: Jun. 8, 2021

(86) PCT No.: PCT/IB2021/055049
§ 371 (c)(1),
(2) Date: Dec. 7, 2022

(87) PCT Pub. No.: WO2021/255580
PCT Pub. Date: Dec. 23, 2021

(65) Prior Publication Data

US 2023/0227709 A1 Jul. 20, 2023

Related U.S. Application Data

(60) Provisional application No. 63/039,235, filed on Jun. 15, 2020.

(51) Int. Cl.
*C09K 5/14* (2006.01)

(52) U.S. Cl.
CPC .................................... *C09K 5/14* (2013.01)

(58) Field of Classification Search
CPC ........................................................ C09K 5/14
See application file for complete search history.

(56) References Cited

U.S. PATENT DOCUMENTS 5,660,917 A 8/1997 Fujimori et al.
5,714,259 A * 2/1998 Holmes ................. B24D 11/00
428/407

(Continued)

FOREIGN PATENT DOCUMENTS

CN 101035876 A 9/2007
DE 3330512 A1 11/1984

(Continued)

OTHER PUBLICATIONS

International Search Report for PCT International Application No. PCT/IB2021/055049, mailed on Oct. 27, 2021, 4 pages.

*Primary Examiner* — Matthew R Diaz
(74) *Attorney, Agent, or Firm* — Ann Benjamin

(57) ABSTRACT

A flowable hardenable composition comprising from 10 to 95 percent by volume of shaped composite particles dispersed in a hardenable binder precursor. The shaped composite particles comprise thermal filler particles having an aspect ratio of at least 1.5 retained in a binder matrix. After hardening, a thermally conductive composition is obtained. An electronic heat sink assembly comprises an electronic component, a heat sink, and the thermally conductive composition sandwiched therebetween.

6 Claims, 1 Drawing Sheet

(56) References Cited

U.S. PATENT DOCUMENTS 5,975,988 A * 11/1999 Christianson .......... B24D 3/344 451/28
6,319,108 B1 * 11/2001 Adefris .................... B24D 3/10 451/526
7,344,574 B2 * 3/2008 Thurber .................. C08L 75/16 451/28
7,976,941 B2 * 7/2011 Lodyga ............. C04B 35/62655 428/323
9,422,200 B2 * 8/2016 Engler ..................... C09K 5/14
10,315,289 B2 * 6/2019 Kasai ....................... B24D 3/14
2003/0022043 A1 1/2003 McElroy et al.
2007/0241303 A1 * 10/2007 Zhong ...................... C08K 9/04 252/62.3 T
2008/0035879 A1 * 2/2008 Matsukawa ......... H01F 41/0246 422/198
2011/0183142 A1 * 7/2011 Gebhardt .............. C04B 28/006 51/308
2018/0134574 A1 * 5/2018 Kobayashi .............. C04B 38/00
2018/0249593 A1 8/2018 Zhang et al.
2019/0283216 A1 * 9/2019 Lukowski ................ B24D 3/32
2019/0329455 A1 10/2019 Uchiya et al.
2021/0238368 A1 * 8/2021 Moyori .................... C08K 3/38

FOREIGN PATENT DOCUMENTS

EP 0480586 B1 3/1997
EP 0783394 B1 5/2003
EP 1770140 A2 4/2007
JP 2013136658 A * 7/2013
JP 2015003980 A * 1/2015 ............... C09K 5/14
JP 2016098301 A * 5/2016 ............... C09K 5/14
WO 2003064111 A1 8/2003
WO 2006023860 A2 3/2006
WO WO-2012033975 A1 * 3/2012 ............... C09K 5/10
WO WO-2013081061 A1 * 6/2013 ............... C09K 5/14
WO WO-2015051354 A1 * 4/2015 ............... C08K 3/04
WO 2019203178 A1 10/2019
WO WO-2019188444 A1 * 10/2019 ............... C09K 5/14

* cited by examiner

FLOWABLE HARDENABLE COMPOSITION, THERMALLY CONDUCTIVE COMPOSITION, AND ELECTRONIC HEAT SINK ASSEMBLY INCLUDING THE SAME

CROSS REFERENCE TO RELATED APPLICATIONS

This application is a national stage filing under 35 U.S.C. § 371 of PCT/IB2021/055049, filed Jun. 8, 2021, which claims the benefit of Provisional Application No. 63/039,235, filed Jun. 15, 2020, the disclosure of which is incorporated by reference in its/their entirety herein.

TECHNICAL FIELD

The present disclosure broadly relates to materials for thermal management, and more particularly to thermal management in electronic devices

BACKGROUND

High through-plane thermal conductivity is needed in gap fillers for electric batteries for autos, electronics (e.g., including electronics used in fifth generation (5G) telecommunications), electrical insulation for motors and transformers, and as dielectric thermal transfer media (gap fillers) in automotive lithium battery assemblies, for example. The need for added efficiency and durability in electrical equipment like motors and transformers stems from the shift to smaller and lighter components that operate at higher frequencies. Elevated operating temperatures can reduce device reliability and lifetime. Many conventional electrical insulation materials have relatively low thermal conductivity, which can limit heat dissipation in electrical devices, thereby imposing constraints on device design and hinder the ability to achieve higher power density devices

SUMMARY

The present disclosure provides flowable hardenable compositions that include shaped composite particles containing thermally conductive particles (i.e., thermal filler particles) that are retained in a binder matrix. Advantageously, after hardening, the flowable hardenable compositions can provide thermal cooling at lower levels of thermal filler particles than compositions wherein the thermal filler is not included in shaped composite particles. This is especially advantageous when flakes, platelet-like or plainly acicular thermal filler particles are used.

Accordingly, in one aspect, the present disclosure provides a flowable hardenable composition comprising from 10 to 95 percent by volume of shaped composite particles dispersed in a hardenable binder precursor, wherein the shaped composite particles comprise thermal filler particles having an aspect ratio of at least 1.5 retained in a binder matrix.

In a second aspect, the present disclosure provides a thermally conductive composition comprising a hardened flowable hardenable composition according to the present disclosure.

In a third aspect, the present disclosure provides an electronic heat sink assembly comprising:

an electronic component;

a heat sink; and a thermally conductive composition according to the present disclosure sandwiched between the electronic component and the heat sink.

As used herein:

The term "deformably compressible" means readily deforming (reversibly or irreversibly) upon application of pressure.

The term "harden" as applied to a composition refers to a process that increases the hardness of the composition, even if the composition remains relatively soft. Examples of hardening processes may include polymerization and freezing.

The term "precisely-shaped" as applied to a composite particle means that the composite particle has an outer surface corresponding in shape to a mold used in its manufacture.

The term "shaped composite particle" refers to a composite particle that has a shape that corresponds at least in part to a nominal predetermined shape. It may be formed, for example, by extrusion, stencil or screen printing, or a molding process.

Features and advantages of the present disclosure will be further understood upon consideration of the detailed description as well as the appended claims.

Figure 1:
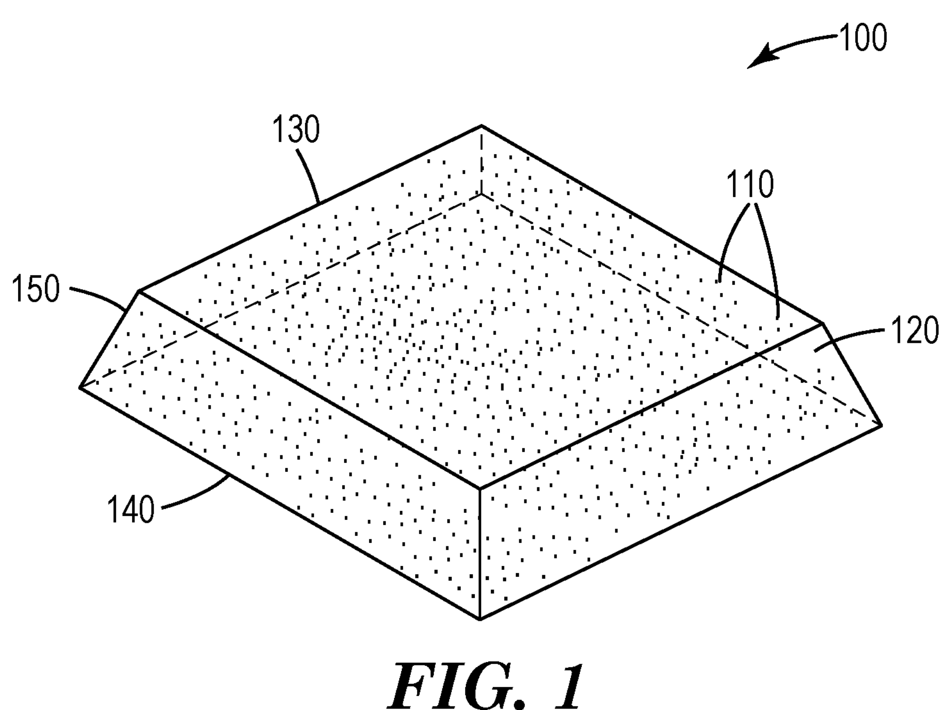
FIG. 1 is a schematic perspective view of exemplary shaped composite particle 100 according to the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

The flowable hardenable composition comprises from 10 to 95 percent by volume, preferably 10 to 50 percent by volume, more preferably 10 to 40 percent by volume, of shaped composite particles dispersed in a hardenable binder precursor. In some embodiments, the shaped composite particles comprise from 12 to 36 percent by volume of the flowable hardenable composition.

Exemplary hardenable binder precursors include polymerizable resins such as epoxy resins, urethane resins, ring-opening metathesis polymerization (ROMP) cycloolefin resins, isocyanurate resins, free-radically polymerizable resins (e.g., mono and/or polyfunctional acrylates, methacrylates, acrylamides, vinyl ethers, and/or maleates), phenolic resins, urea-formaldehyde resins, aminoplast resins, silicone resins, and crosslinkable polymer latexes. Polymerizable resins typically further include a catalyst, crosslinker, and/or initiator (thermal initiator and/or photoinitiator) suitable for causing polymerization, although this is not a requirement. The selection and amount (e.g., 0.01 to 10 percent by weight) of the catalyst, crosslinker, and/or initiator will depend on the specific chemical system chosen, and is within the capability of those of ordinary skill in the art.

Exemplary hardenable binder precursors also include solvent-borne thermoplastic polymers, molten polymers (e.g., molten hot melt adhesives), and non-crosslinking latexes (e.g., acrylic latexes).

Referring now to FIG. 1, exemplary precisely-shaped composite particle 100 comprises thermal filler particles 110 retained in a binder matrix 120. Shaped composite particle 100 has a shape defined by top 130, bottom 140, and sides 150.

The thermal filler particles can include electrically-insulative and/or electrically-conductive thermally conductive particles.

Exemplary electrically-insulative thermal fillers include boron nitride, aluminum nitride, silicon nitride, aluminum oxide (alumina), magnesium oxide, zinc oxide, silicon oxide, beryllium oxide, titanium oxide, copper oxide, cuprous oxide, magnesium hydroxide, aluminum hydroxide, silicon carbide, diamond, talc, mica, kaolin, bentonite, magnesite, pyrophyllite, titanium boride, calcium titanate, and combinations thereof. Boron nitride may have any structure, such as c-BN (cubic structure), w-BN (wurtzite structure), h-BN (hexagonal structure), r-BN (rhombohedral structure), or t-BN (turbostratic structure). Among these, from the perspectives of thermal conductivity and cost, aluminum oxide, aluminum hydroxide, zinc oxide, boron nitride, and aluminum nitride are generally preferred. Aluminum oxide and aluminum hydroxide are more preferred, and aluminum hydroxide is particularly preferred.

Exemplary electrically-conductive thermally fillers include graphite, carbon black, graphite, carbon fibers (pitch-based, PAN-based), carbon nanotubes (CNT), graphene, carbon fibers (CNF), silver, copper, iron, nickel, aluminum, titanium, alloys thereof, stainless steel (SUS), zinc oxide to which different type of element is doped, ferrites, and combinations thereof. An insulating raw material, such as silica, may be coated with an electrically conductive thermally conductive raw material to make it electrically conductive, or an electrically conductive thermally conductive raw material may be coated with an insulating raw material, such as silica, to make it insulating, and these may be used as the thermally conductive raw materials.

The thermal filler particles preferably have a thermal conductivity of at least 1.0 W/mK, at least 1.2 W/mK, at least 1.5 W/mK, at least 1.7 W/mK, at least 2.0 W/mK, at least 2.5 W/mK, at least 10 W/mK, at least 20 W/mK, at least 40 W/mK, or even at least 50 W/mK, although lower and higher thermal conductivities may also be used.

Thermal filler particles may have any shape; for example, spheroidal, blocky, needle-like, and/or flake/platelet shapes may be used.

The thermal filler particles may have any particle size, but preferably have a maximum dimension in the size range of 100 nanometers (nm) to 1 millimeter (mm).

The thermal filler particles may be present in any amount in the shaped composite particles; however, higher amounts are typically preferable. In some embodiments, the thermal filler particles comprise from 50 to 99 volume percent of the shaped composite particles. More preferably, the thermal filler particles comprise from 55 to 99 volume percent, 60 to 99 volume percent, 65 to 99 volume percent, 70 to 99 volume percent, 75 to 99 volume percent, 80 to 99 volume percent, 85 to 99 volume percent, or even 90 to 99 volume percent of the shaped composite particles.

The binder matrix of the shaped composite particles may comprise any material(s) capable of retaining the thermal filler particles. It can be organic or inorganic.

Organic binder matrixes can comprise a thermoplastic polymer and/or a thermoset resin, for example. Examples of suitable thermoplastic polymers include polyolefins, polyesters, thermoplastic polyurethanes, and polyamides. Examples of thermoset resins include cured epoxy resins, cured urethane resins, cured ring-opening metathesis polymerization (ROMP) cycloolefin resins, cured isocyanurate resins, free-radically polymerized resins (e.g., polymerized mono- and/or polyfunctional acrylates, methacrylates, acrylamides, vinyl ethers, and/or maleates), cured phenolic resins, cured urea-formaldehyde resins, cured aminoplast resins, cured silicone resins, and crosslinked polymer latexes.

Details concerning general methods for forming shaped (including precisely-shaped) composite particles having an organic binder matrix can be found, for example, in U.S. Pat. No. 5,714,259 (Holmes et al.). In one common method, a mixture of thermal filler particles and a precursor material for the organic binder matrix are disposed into mold cavities in a production tool and cured.

The shaped composite particles may further include, for example, one or more of plasticizer(s), pigment(s), stabilizer(s), and filler particles other than the thermal filler particles.

Inorganic binder matrixes may comprise glass, ceramic, and glass ceramics, for example.

The shaped composite particles may be made by any suitable technique including, for example, in the case of organic binder matrixes molding (open or closed mold), extrusion, stencil or screen printing, or additive manufacturing, or, in the case on inorganic matrixes spray drying or crushing of mixture of an inorganic binder cursor material, followed by heating (e.g., calcining and/or sintering).

Details concerning general methods for forming shaped (including precisely-shaped) composite particles having an inorganic binder matrix can be found, for example, in U.S. Pat. No. 10,315,289 B2 (Fletcher et al.). In one common method, a mixture of thermal filler particles and a precursor material for the organic binder matrix are disposed into mold cavities in a production tool, dried, removed, from the production tool and sintered.

Shaped composite particles may have any predetermined shape. Examples include 3-, 4-, 5-, or 6-sided pyramids; 3-, 4-, 5-, or 6-sided truncated pyramids, cones, truncated cones, spheres, rods, saddles, yurt-shaped structures, as well as more complex shapes.

The shaped composite particles may have any particle size, but preferably have a maximum dimension in the size range of 1 micron to 5 mm, more preferably 1 micron to 0.1 mm.

Flowable hardenable compositions according to the present disclosure and/or hardened sheets derived therefrom of are useful, for example, in electronics applications as gap fillers between an electronic component and a heat sink.

Exemplary hardenable binder precursors include polymerizable resins such as epoxy resins, urethane resins, ring-opening metathesis polymerization (ROMP) cycloolefin resins, isocyanurate resins, free-radically polymerizable resins (e.g., mono and/or polyfunctional acrylates, methacrylates, acrylamides, vinyl ethers, and/or maleates), phenolic resins, urea-formaldehyde resins, aminoplast resins, silicone resins, and crosslinkable polymer latexes. Polymerizable resins typically further include a catalyst, crosslinker, and/or initiator (thermal initiator and/or photoinitiator) suitable for causing polymerization. The selection and amount (e.g., 0.01 to 10 percent by weight) of the catalyst, crosslinker, and/or initiator will depend on the specific chemical system chosen, and is within the capability of those of ordinary skill in the art.

Exemplary hardenable binder precursors also include solvent-borne thermoplastic polymers, molten polymers (e.g., molten hot melt adhesives), and non-crosslinking latexes (e.g., acrylic latexes).

Figure 2:
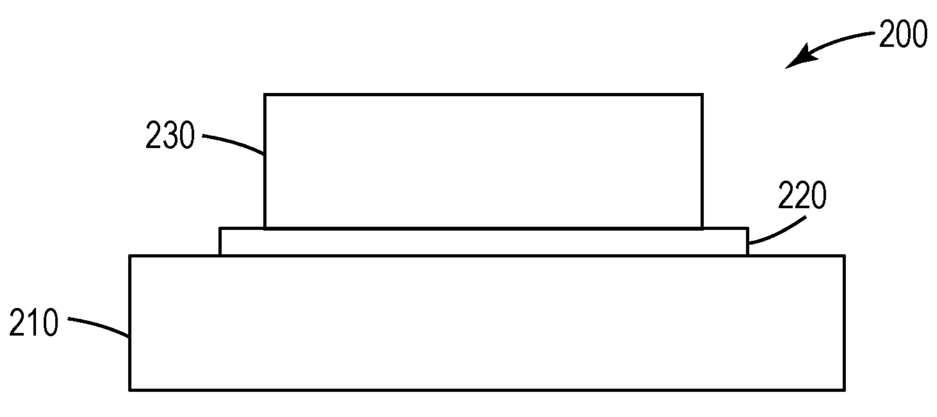
FIG. 2 is a schematic side view of exemplary electronic heat sink assembly 200.

Referring now to FIG. 2, electronic heat sink assembly 200 comprises electronic component 210, heat sink 230, and thermally conductive composition 220 disposed therebetween. Thermally conductive composition 220 comprises a material derived from hardening the flowable hardenable composition.

Thermally conductive compositions according to the present disclosure may be provided as a hardened sheet, or more typically, by applying the flowable hardenable composition (e.g., using a nozzle dispenser) to at least one of the electronic component or the heat sink which as then brought together with the flowable hardenable composition disposed therebetween. Subsequent hardening of the flowable hardenable composition results in the thermally conductive composition.

Examples of electronic components include any electronic component that generates heat such as, for example, integrated circuits, motors, generators, batteries, and transformers.

Heat sinks are well-known in the electronics art, and are often formed of thermally conductive material (e.g., a metal) having substantial thermal mass relative to the part that they are intended to cool. Often, the heat sink comprises cooling fins and/or posts.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Unless otherwise indicated, all other reagents were obtained, or are available from fine chemical vendors such as Sigma-Aldrich Company, St. Louis, Missouri, or may be synthesized by known methods. Table 1 (below) lists materials used in the examples and their sources.

TABLE 1

| DESIGNATION | DESCRIPTION | SOURCE |
|---|---|---|
| CB 2128 | Crosslinkable binder; olefin thermoset resin obtained as PROXIMA HPR 2128 | Materia Inc., Pasadena, California |
| CB 1837 | Crosslinkable binder; olefin thermoset resin obtained as PROXIMA HTI 1837 | Materia Inc. |
| CB 1930 | Crosslinkable binder; olefin thermoset resin obtained as EXP 1930 | Materia Inc. |
| Catalyst 1 | Catalyst; Olefin metathesis catalyst (1% in mineral oil), obtained as PROXIMA CT 762 | Materia Inc. |
| BN 1 | Boron nitride (BN); BN flakes obtained as CFP 0075 | 3M Company, Saint Paul, Minnesota |
| BN 2 | Boron nitride (BN); BN aggregate obtained as CFP 012 | 3M Company |
| Alumina 1 | Thermally conductive alumina filler; Alumina flake obtained as AP10 | DIC Corp., Chiba, Japan |
| Alumina 2 | Thermally conductive alumina filler; Alumina aggregate obtained as AC60 | DIC Corporation |

TABLE 1-continued

| DESIGNATION | DESCRIPTION | SOURCE |
|---|---|---|
| AdProm 1 | Adhesion promoter; Modified diphenylmethane diisocyanate (MDI)-terminated polyether prepolymer based on polytetramethylene ether glycol (PTMEG) obtained as BAYTEC ME-230 | Covestro, Pittsburg, Pennsylvania |
| Dispersant 1 | Dispersant; Solvent-free wetting and dispersing additive obtained as DISPERBYK-145 | BYK USA, Inc., Wallingford, Connecticut |

Test Methods

Thermal Conductivity Test Method

The effective thermal conductivity was determined following ASTM D5470 version 12 using a Thermal Interface Material (TIM) Tester (Analysis Tech, Wakefield, Massachusetts). Samples of 33 millimeter (mm) in diameter were punched from the sliced specimen and placed on the bottom plate of the TIM Tester. The pressure was set to 100 pounds per square inch (0.69 MPa).

Procedure for Making Shaped Abrasive Composites Sac1-Sac2

Compositions (see Table 2) were mixed in a jar. Once mixed, the composition was urged against a production tool having mold cavities (truncated square pyramids, 0.0508 mm bottom side length, 0.0789 mm top side length, 0.1000 mm depth) by pouring and then a plastic spatula was used to wipe the excess from the top. The filled production tool were placed in a conventional oven set to 80° C. for one hour. An ultrasonic horn was utilized to aid in removing aggregates from the mold

TABLE 2

| MATERIAL | SAC-1 | SAC-2 |
|---|---|---|
| Alumina 1, g | 36.0 | |
| Alumina 2, g | | |
| BN 1, g | | 36.0 |
| BN 2, g | | |
| CB 2128, g | | |
| CB 1837, g | 4.0 | 4.0 |
| CB 1930, g | | |
| Dispersant 1, g | 0.4 | 0.4 |
| AdProm 1, g | 0.4 | 0.4 |
| Catalyst 1, g | 0.4 | 0.4 |
| Toluene, g | 20.0 | 37.0 |

Procedure for Making Comparative Thermally Conductive Sheets Cex1-Cex2

All components besides the catalyst were added to a plastic container according to Table 3 and hand mixed using a tongue depressor. The mixture was then mixed for 10 seconds at 1000 revolutions per minute (RPM), 2 minutes at 1500 RPM, and 10 second at 1000 RPM using a Model DAC 600 high speed mixer from FlackTek (Landrum, S. C.). The catalyst was added and then mixed for 20 seconds under 100 kilopascal (kPa) of pressure at 1000 RPM, followed by 30 seconds under 4 kPa of pressure at 1500 RPM.

The mixture was then transferred from the plastic container onto a release liner. A release liner was also applied on top of the mixture. Spacers were used (50 mils thick (1.3 millimeters)) and the mixture was pressed with a high enough pressure to rely on the spacers to provide sample thickness (e.g., 1000 pounds per square inch (PSI) on a 6 inch by 6 inch (15 centimeters by 15 centimeters) press, with a contact area of 3 inches by 3 inches (8 centimeters by 8 centimeters)) at room temperature into a uniform sheet. A model C Press (Carver, Wabash, Indiana) was used for pressing. The pressed sheets were then placed into a pre-heated oven set at 80° C. and heated for one hour.

TABLE 3

| MATERIAL | CEX1 | CEX2 |
|---|---|---|
| Alumina 1, g (wt %) | 0 | 25.0 (66.5) |
| Alumina 2, g (wt %) | 0 | 0 |
| BN 1, g (wt %) | 15.0 (54.3) | 0 |
| CB 1837, g (wt %) | 10.0 (36.2) | 10.0 (26.6) |
| CB 1930, g (wt %) | 2.0 (7.2) | 2.0 (5.3) |
| Dispersant 1, g (wt %) | 0.2 (0.7) | 0.2 (0.5) |
| AdProm 1, g (wt %) | 0.2 (0.7) | 0.2 (0.5) |
| Catalyst 1, g (wt %) | 0.2 (0.7) | 0.2 (0.5) |

Procedure for Making Thermally Conductive Sheets Ex1-Ex4

Shape composite particles made as described above were combined with additional components, in amounts reported in Table 4, in a glass jar and mixed by hand with a tongue depressor. The mixture 36.1 was then pressed into uniform sheets or coated using a knife coater between liners.

For pressing, the mixture was then transferred from the jar onto a release liner. A release liner was also applied on top of the mixture. Spacers were used (50 mils thick (1.3 mm)) and the mixture was pressed with a high enough pressure to rely on the spacers to provide sample thickness (e.g., 1000 pounds per square inch (6.9 MPa) on a 6 inch by 6 inch (15 cm by 15 cm) press, with a contact area of 3 inches by 3 inches (8 cm by 8 cm)) at room temperature into a uniform sheet. A model C Carver Press was used for pressing. The pressed sheets were then placed into a pre-heated oven set at 80° C. and heated for one hour.

For knife coating, two sheets of release liner were cut to 36 inches (91 cm) in length. The knife coater was checked for the desired gap (50 mils (1.3 mm)). The sample was deposited or poured right before the knife entrance and the liners were pulled from the other side to obtain a sheet of material between the liners that could then be placed in an oven set to 80° C. for one hour. Knife coating was performed at room temperature.

In Table 4, below, Examples EX1 and EX3 were knife coated between two liners, and Examples EX2 and EX4 were pressed.

TABLE 4

| MATERIAL | EX1 | EX2 | EX3 | EX4 |
|---|---|---|---|---|
| CB 1837, g (wt. %) | 5.0 (47.6) | 5.0 (47.6) | 5.0 (47.6) | 5.0 (47.6) |
| Dispersant 1, g (wt. %) | 0.2 (1.9) | 0.2 (1.9) | 0.2 (1.9) | 0.2 (1.9) |
| AdProm 1, g (wt. %) | 0.2 (1.9) | 0.2 (1.9) | 0.2 (1.9) | 0.2 (1.9) |
| Catalyst 1, g (wt. %) | 0.1 (1.0) | 0.1 (1.0) | 0.1 (1.0) | 0.1 (1.0) |
| SAC-1, g (wt. %) | 5.0 (47.6) | 5.0 (47.6) | 0 | 0 |
| SAC-2, g (wt. %) | 0 | 0 | 5.0 (47.6) | 5.0 (47.6) |

TABLE 5

| EXAMPLE | DESCRIPTION | THERMAL CONDUCTIVITY, W/m · K |
|---|---|---|
| CEX1 | BN1 comparative example; approx. 54.3 wt. % and 36.1 vol. % | 1.27 |
| CEX2 | Alumina 1 comparative example; approx. 66.5 wt. % and 33.7 vol. % | 0.54 |
| EX1 | Alumina 1, 750 micron agglomerate; approx. 41.6 wt. % and 15.4 vol. % | 0.47 |
| EX2 | Alumina 1, 750 micron agglomerate; approx. 41.6 wt. % and 15.4 vol. % | 0.88 |
| EX3 | BN1, 750 micron agglomerate; approx. 41.6 wt. % and 25.3 vol. % | 1.28 |
| EX4 | BN1, 750 micron agglomerate; approx. 41.6 wt. % and 25.3 vol. % | 1.06 |

In the event of inconsistencies or contradictions between portions of the incorporated references and this application, the information in this application shall control. The preceding description, given in order to enable one of ordinary skill in the art to practice the claimed disclosure, is not to be construed as limiting the scope of the disclosure, which is defined by the claims and all equivalents thereto.

What is claimed is:

1. A thermally conductive composition comprising a hardened flowable hardenable composition comprising from 10 to 95 percent by volume of truncated square pyramid-shaped composite particles dispersed in a hardenable binder precursor, wherein the truncated square pyramid-shaped composite particles comprise at least one of aluminum oxide thermal filler particles and boron nitride thermal filler particles having an aspect ratio of at least 1.5 retained in a binder matrix.

2. The thermally conductive composition of claim 1, wherein the hardened flowable hardenable composition has a thermal conductivity of at least 1.0 W/m·K.

3. The thermally conductive composition of claim 1, wherein the hardened flowable hardenable composition has a thermal conductivity of at least 2.5 W/m·K.

4. An electronic heat sink assembly comprising:

an electronic component;

a heat sink; and the thermally conductive composition according to claim 1 sandwiched between the electronic component and the heat sink.

5. The electronic heat sink assembly of claim 4, wherein the electronic component comprises an integrated circuit.

6. The electronic heat sink assembly of claim 4, wherein the electronic component comprises a motor, generator, or a transformer.

* * * * *